US010005085B2

(12) United States Patent
Wright et al.

(10) Patent No.: US 10,005,085 B2
(45) Date of Patent: Jun. 26, 2018

(54) ION FILTRATION AIR CLEANER

(71) Applicant: Helen of Troy Limited, Belleville, St. Michael (BB)

(72) Inventors: Cheri Wright, Medfield, MA (US); John Wilcox, Newport, RI (US)

(73) Assignee: Helen of Troy Limited, Belleville, St. Michael (BB)

( * ) Notice: Subject to any disclaimer, the term of this patent is extended or adjusted under 35 U.S.C. 154(b) by 0 days. days.

(21) Appl. No.: 15/718,614

(22) Filed: Sep. 28, 2017

(65) Prior Publication Data

US 2018/0015480 A1 Jan. 18, 2018

Related U.S. Application Data

(62) Division of application No. 14/356,517, filed as application No. PCT/US2012/029064 on Mar. 14, 2012, now Pat. No. 9,789,493.

(Continued)

(51) Int. Cl.

| | |
|---|---|
| ***B01D 53/02*** | (2006.01) |
| ***B03C 3/011*** | (2006.01) |
| ***B03C 3/36*** | (2006.01) |
| ***B03C 3/09*** | (2006.01) |
| ***B03C 3/12*** | (2006.01) |

(Continued)

(52) U.S. Cl.

CPC ................ *B03C 3/011* (2013.01); *B03C 3/09* (2013.01); *B03C 3/12* (2013.01); *B03C 3/155* (2013.01); *B03C 3/363* (2013.01); *B03C 3/366* (2013.01); *B03C 3/368* (2013.01); *B03C 3/41* (2013.01); *B03C 3/47* (2013.01)

(58) Field of Classification Search

CPC .. B03C 3/011; B03C 3/09; B03C 3/12; B03C 3/155; B03C 3/363; B03C 3/366; B03C 3/368; B03C 3/41; B03C 3/47

See application file for complete search history.

(56) References Cited

U.S. PATENT DOCUMENTS

| | | | |
|---|---|---|---|
| 2,634,818 | A | 4/1954 | Wintermute |
| 4,144,359 | A | 3/1979 | Zahedi et al. |

(Continued)

FOREIGN PATENT DOCUMENTS

| | | |
|---|---|---|
| DE | 102007020504 | 11/2007 |
| EP | 1864840 | 12/2007 |

(Continued)

OTHER PUBLICATIONS

International Search Report and Written Opinion from PCT/US12/29064 dated Jun. 19, 2012.

*Primary Examiner* — Christopher P Jones

(74) *Attorney, Agent, or Firm* — Rankin, Hill & Clark LLP

(57) ABSTRACT

A method for filtering air includes: passing air through a prefilter disposed in a housing to remove at least a portion of particulates suspended in the air to thereby create prefiltered air; passing the prefiltered air by an ionizer disposed in the housing to ionize at least a portion of the particulates suspended in the air to thereby create ionized particulates in the prefiltered air, the ionizer downstream from the prefilter and upstream from the fan positioned to create an airflow within the housing; and prior to the prefiltered air exiting the housing with ionized particulates, causing the ionized particulates to pass through an electrostatically charged main filter disposed within the housing downstream from each of the ionizer and the fan.

7 Claims, 3 Drawing Sheets

Related U.S. Application Data

(60) Provisional application No. 61/453,060, filed on Mar. 15, 2011.

(51) Int. Cl.

| | |
|---|---|
| ***B03C 3/155*** | (2006.01) |
| ***B03C 3/41*** | (2006.01) |
| ***B03C 3/47*** | (2006.01) |

(56) References Cited

U.S. PATENT DOCUMENTS

| | | | |
|---|---|---|---|
| 5,647,890 | A | 7/1997 | Yamamoto |
| 6,398,852 | B1 | 6/2002 | Loreth |
| 2004/0226448 | A1 | 11/2004 | Griffiths et al. |
| 2005/0160907 | A1 | 7/2005 | Zhang et al. |
| 2007/0034082 | A1 | 2/2007 | Adair et al. |
| 2008/0138242 | A1 | 6/2008 | Park et al. |
| 2008/0156186 | A1 | 7/2008 | McKinney |
| 2008/0250926 | A1 | 10/2008 | Riskin |
| 2010/0251895 | A1 | 10/2010 | Vanderginst |

FOREIGN PATENT DOCUMENTS

| | | |
|---|---|---|
| EP | 2208538 | 7/2010 |
| GB | 1493419 | 11/1977 |
| WO | 8804580 | 6/1988 |

Fig. 1, Prior Art

ION FILTRATION AIR CLEANER

CROSS-REFERENCE TO RELATED APPLICATIONS

This application claims the benefit of U.S. Provisional Application No. 61/453,060, filed Mar. 15, 2011, the contents of which are incorporated herein by reference.

BACKGROUND OF THE INVENTION

1. Field of the Invention

The present invention generally relates to the field of air cleaning systems. More specifically, the present invention relates to an ion filtration device ("IFD") for cleaning air by use of electrostatic ion attraction.

2. Description of the Related Art

Air having a high concentration of suspended particles (hereinafter, "dirty air") can pose a health hazard to living beings from breathing the dirty air. The dirty air can also cause a higher rate of deposition of settled suspended particles (e.g., dust) thus causing more frequent cleaning of surfaces that are desired to be kept clean (e.g., surfaces inside a home).

In farming, high aerosol concentrations are found in situations such as poultry sheds and intensive pig rearing sheds etc., and thus the health of both workers and animals is at risk.

In industry a variety of processes such as welding, grinding, smelting and use of internal combustion engines in confined spaces all produce high concentrations of suspended particles in enclosed spaces.

In social and domestic situations, suspended particles are produced by tobacco smoking. Sneezing can produce aerosols of bacteria and viruses. Allergy producing pollen is found in high concentrations at various times of the year. Dust mite allergen particles are produced when making up beds and enter the air as suspended particles.

Conventional air cleaners may remove particles from the air by trapping them either in filters as in a filtration air cleaner (FAC), or by collecting them on plates as in an electrostatic precipitation air cleaner (ESPAC). The filters or plates may then be disposed of, washed or replaced.

Disadvantages of FAC devices include a drop in efficiency of the filter over time as particles clog the filter; the need for a fan powerful enough to overcome the partially-clogged filter; noise and power consumption associated with the fan; and the need to replace the filters regularly.

Disadvantages of ESPAC devices include: a need for costly shielding of high voltage plates; loss of efficiency and generation of ozone caused by electrical breakdown and leakage between the high voltage plates; and a need to space the high voltage plates relatively far apart to reduce electrical breakdown in the air between the high voltage plates, thus increasing size and reducing efficiency.

Electrostatic precipitation air cleaners operate by attracting charged particles and ions to collection plates charged with an opposite electrical charge from that of the charged particles and ions. A variation of the ESPAC device is to replace the high voltage plates with an air passage, the air passage having at least a portion thereof having an electrical potential, electrets properties, electrostatic properties, or the like. An example of such a device known in the art is U.S.

Pat. No. 6,749,669 to Griffiths, et al., the contents of which are incorporated by reference herein.

However, the particles and ions that are to be collected may not ordinarily be in a charged state, so charge must be introduced onto the particles and ions in order to attract them to the collection plates. Conventional electrostatic air cleaners of this kind introduce charge onto the particles and ions as they leave the cleaner by use of an ionizer to electrically ionize the gas or air stream. The ionizer may include a primary corona discharge emitter and a secondary corona discharge emitter at a lower potential relative to the primary emitter. The primary corona discharge emitter is connected to a high negative potential while the secondary corona discharge emitter is connected to electrical ground. The primary corona discharge emitter may be a needle having a sharp tip and the secondary corona discharge emitter may be a needle having a relatively blunt tip.

Since the ionizer imparts charge upon particles and ions as they leave the cleaner, the ions so charged must travel back to an air inlet of the conventional electrostatic air cleaner in order to be collected. This presents a disadvantage of the known art, because some particles so ionized may not return to the air inlet, and particles which do return to the air inlet may lose some or all of their charge before returning. Unless the electrostatic air cleaner is operating in a confined space, few adequately charged ions may return to the air inlet. Consequently, there is a need for a more efficient electrostatic air cleaner

SUMMARY OF THE INVENTION

In one aspect of the invention an ion filtration device (IFD) is disclosed. The IFD includes a housing, a fan that creates an airflow within the housing, a prefilter disposed within the housing, an ionizer disposed within the housing downstream from the prefilter, and an electrostatically charged main filter disposed within the housing downstream from the ionizer. The fan is preferably disposed within the housing. In some embodiments a serpentine pathway is disposed between the ionizer and the main filter, and the airflow passes through the serpentine pathway prior to passing through the main filter. In other embodiments baffles are disposed between the ionizer and the main filter, and the airflow passes through the baffles prior to passing through the main filter.

In another aspect of the invention a method for filtering air is disclosed. Air is passed through a prefilter disposed in a housing to remove at least a portion of particulates suspended in the air. The air is then passed by an ionizer disposed in the housing to ionize at least a portion of the particulates suspended in the air. Finally, prior to the air exiting the housing, the ionized particulates are passed through an electrostatically charged main filter disposed within the housing. In some embodiments air is passed through baffles subsequent to passing by the ionizer and prior to passing through the electrostatically charged main filter. In other embodiments the air is passed through a serpentine pathway subsequent to passing by the ionizer and prior to passing through the electrostatically charged main filter.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE PREFERRED EMBODIMENTS

Embodiments of the present invention generally relate to the field of air cleaning systems. More specifically, embodiments relate to an ion filtration device ("IFD") for cleaning air by use of electrostatic ion attraction.

Figure 1:
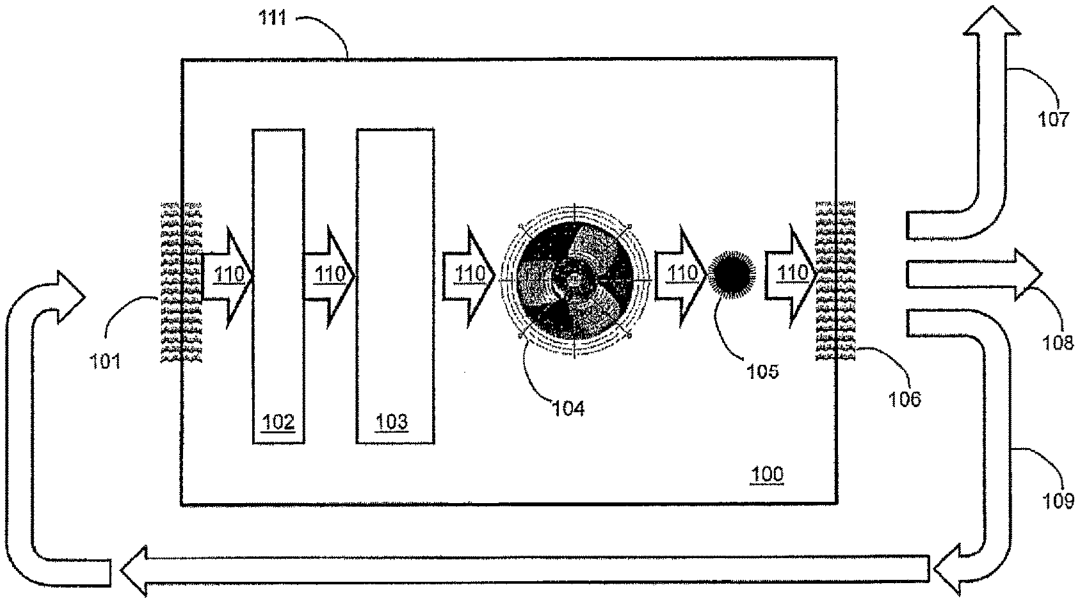
FIG. 1 is functional schematic view of a conventional electrostatic air cleaner apparatus as known in the art.

Referring to FIG. 1, a functional schematic of a conventional IFD 100 is illustrated. Within housing 111, fan 104 creates an airflow 110 within IFD 100 such that air is drawn into IFD 100 through an inlet 101 and passes first through a prefilter 102. Prefilter 102 removes large dust particles and fibers. Airflow 110 next passes through main filter 103, which is electrostatically charged to attract the incoming particles which carry the opposite charge from that of main filter 103. When IFD 100 is first turned on, it is expected that there will be few or no such charged particles in the confined space that IFD 100 is operating, therefore at first main filter 103 will not be very effective in removing charged particles.

Next, fan 104 pushes airflow 110 past ionizer 105 which releases charged ions (not shown in FIG. 1) that enter airflow 110 and exit IFD through outlet 106. Air expelled from outlet 106 may disperse in substantially any direction, as indicated by exemplary directions 107, 108 and 109. As the air expelled from outlet 106 disperses throughout the space surrounding IFD 100, ions may transfer charge to suspended particles in the space surrounding IFD 100. A portion of the ions and/or charged particles eventually make their way back to inlet 101, such as along exemplary path 109.

It can be seen that conventional IFD 100 is not efficient, at least for the following reasons. First, main filter 103 is not fully effective until charged particles pass through it. Second, because there is no control over the direction of air and ions that are expelled through outlet 106, only a fraction may reach their way back to the inlet 101, and the flow from outlet 106 to inlet 101 may be entirely blocked by drafts and air currents exterior to IFD 100. Third, charged particles may adhere to other surfaces in the space surrounding IFD 100, thereby causing an unwanted buildup of particles in unwanted locations. Fourth, because there may be a significant time delay between ionization and the entry of particles charged by those ions into inlet 101, the strength of the electrostatic charge may decay, causing reduced efficiency of main filter 103.

Figure 2:
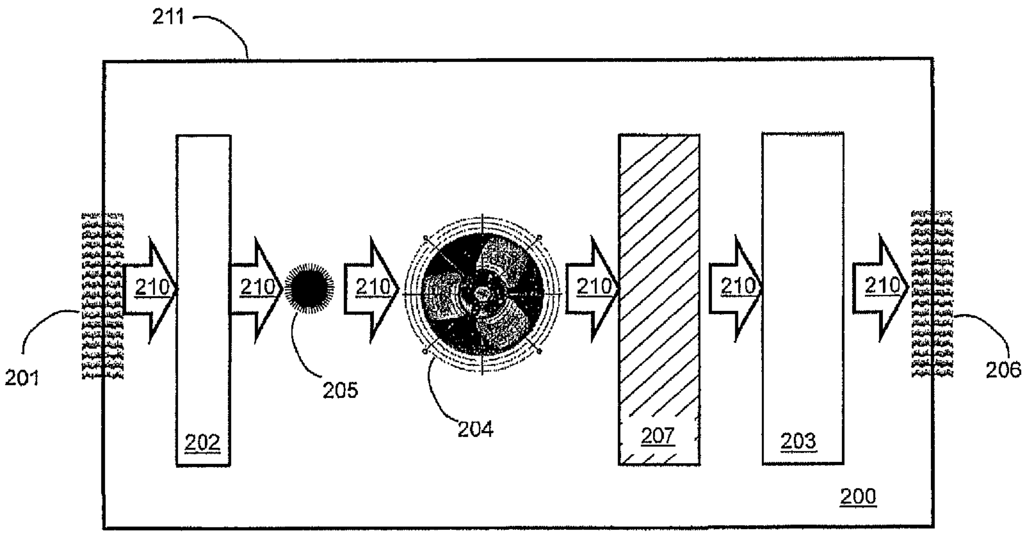
FIG. 2 is a functional schematic view of an electrostatic air cleaner apparatus according to an embodiment of the present invention.

FIG. 2 is a functional schematic of an improved IFD 200 according to an embodiment of the invention. In this embodiment, a structural difference compared to conventional IFD 100 is that a main filter 203, which is electrostatically charged to attract the incoming particles carrying the opposite charge from that of main filter 203, is located in airflow 210 downwind or downstream from an ionizer 205.

In operation of IFD 200, within a housing 211 a fan 204 creates an airflow 210 within IFD 200 such that air is drawn into IFD 200 through an inlet 201 and passes first through a prefilter 202. Prefilter 202 removes large dust particles and fibers. Airflow 210 next passes adjacent to ionizer 205, which creates ions (not shown in FIG. 2). Charge from the ions may then be transferred to any suspended particles that had passed through prefilter 202.

Next, fan 204 pushes airflow 210 through main filter 203, which attracts the incoming particles that carry the opposite charge from that of the ions. Finally, airflow 210 exits from IFD 200 through outlet 206.

The embodiment of FIG. 2 may have a longer internal path for airflow 210 than the internal path for airflow 110 of a conventional IFD. The longer internal path allows for more effective mixing of ions with air, and provides a longer time for any particles suspended in airflow 210 to become charged. The longer path for airflow 210 is achieved by moving the main filter 203 to be near outlet 206, and by placing the ionizer 205 just after prefilter 202. This lengthens the path of airflow 210 between ionizer 205 and main filter 203, allowing the particles in the air more time to become charged, and thus removing the suspended particles more effectively from the airflow 210 by main filter 203. The air cleansed by main filter 203 will leave the improved IFD 200 in a relatively uncharged condition.

The operation of improved IFD 200 is more efficient than that of conventional IFD 100 at least for the following reasons. First, main filter 203 is fully effective more quickly because charged particles begin passing through it almost immediately after turning on improved IFD 200. Second, the vast majority of suspended particles charged by ionizer 205 will likely pass through main filter 203, regardless of air flows outside of improved IFD 200. Third, charged particles are less likely to adhere to surfaces outside of improved IFD 200. Fourth, there is less decay of charge on the charged particles before they are filtered by main filter 203.

Figure 3:
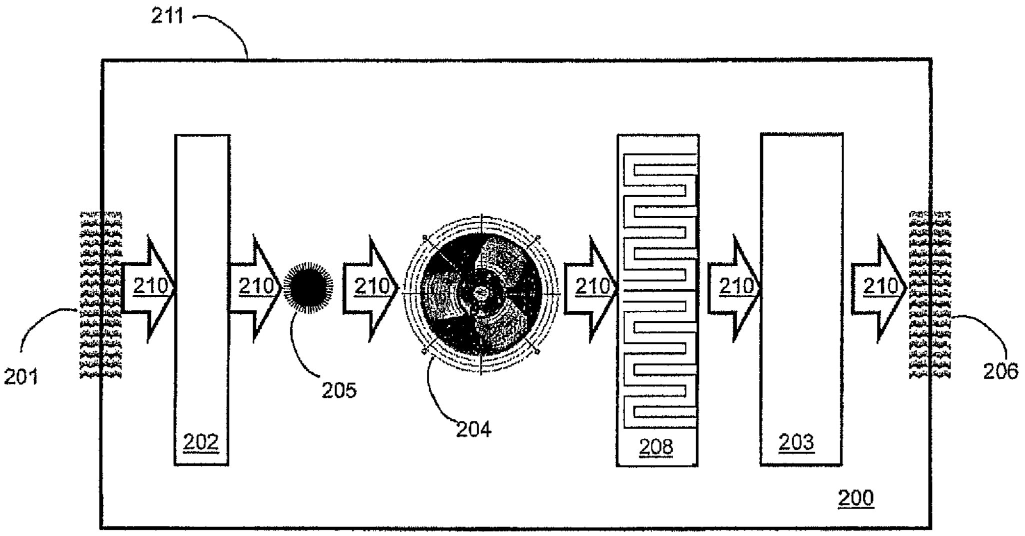
FIG. 3 is a functional schematic view of an electrostatic air cleaner apparatus according to another embodiment of the present invention.

The effectiveness of this design can be improved by further lengthening the time that the air and emitted charge are together inside the unit between the inlet and the outlet, thereby maximizing the charge mixing and therefore maximizing the filter efficiency. This may be accomplished by further lengthening the path in order to lengthen the time available for charge transfer, and in particular the airflow path between ionizer 205 and filter 203. For instance, as shown in FIG. 3, a serpentine path 208 can increase the length of airflow 210 without unduly increasing the exterior size of improved IFD 200. Such a serpentine path 208 is preferably disposed downstream from the ionizer 205, such as between fan 204 and main filter 203, or between ionizer 205 and fan 204. As shown in FIG. 2, baffles 207 or the like can also be introduced into airflow 210, such as downstream from ionizer 205 and upstream from main filter 203, in order to increase the path length, provide more turbulence for more effective mixing, and/or slow airflow 210 to provide more time for mixing.

While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Those skilled in the art will recognize that the present invention has many applications, may be implemented in various manners and, as such is not to be limited by the foregoing embodiments and examples. Any number of the features of the different embodiments described herein may be combined into one single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there have been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A method for filtering air, comprising:

passing air through a prefilter disposed in a housing to remove at least a portion of particulates suspended in the air to thereby create prefiltered air;

passing the prefiltered air by an ionizer disposed in the housing to ionize at least a portion of the particulates suspended in the air to thereby create ionized particulates in the prefiltered air, the ionizer downstream from the prefilter and upstream from a fan positioned to create an airflow within the housing;

prior to the prefiltered air exiting the housing with ionized particulates, causing the ionized particulates to pass through an electrostatically charged main filter disposed within the housing downstream from each of the ionizer and the fan, and mixing the prefiltered air using baffles or a serpentine pathway subsequent to passing by the ionizer and prior to passing through the electrostatically charged main filter.

2. The method of claim 1, wherein the baffles are separate from the ionizer and the electrostatically charged main filter.

3. The method of claim 2, wherein the fan is disposed within the housing upstream of the baffles.

4. The method of claim 1, wherein the serpentine pathway is separate from the ionizer and the electrostatically charged main filter.

5. The method of claim 4, wherein the fan is disposed within the housing upstream of the serpentine pathway.

6. The method of claim 1, wherein the electrostatically charged main filter comprises at least one electrically charged collection plate.

7. The method of claim 1, wherein the ionizer comprises a primary corona discharge emitter and a secondary corona discharge emitter.

* * * * *